April 16, 1929.  H. C. HARRISON  1,709,571
ELECTROMECHANICAL TRANSLATING DEVICE
Filed Nov. 5, 1925   3 Sheets-Sheet 1
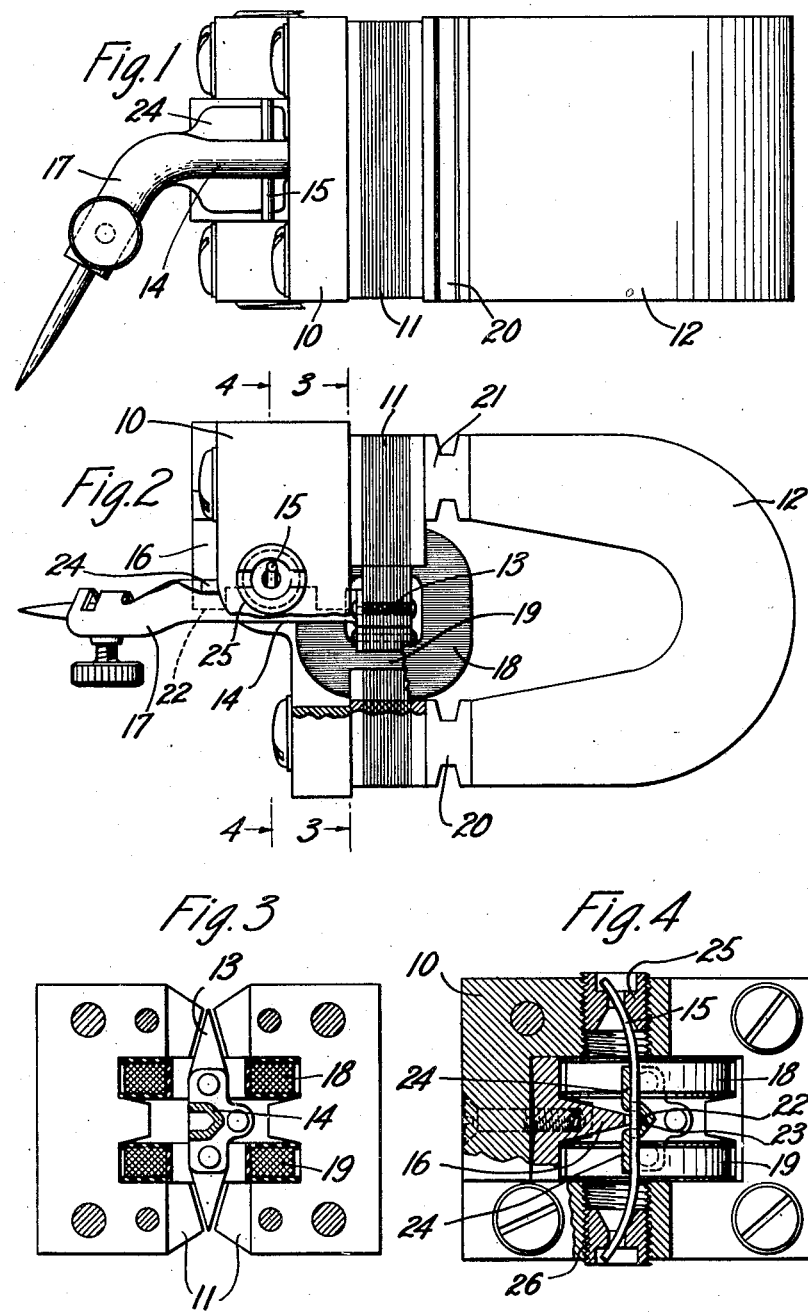
Inventor:
Henry C. Harrison,
by Ew a dam, Atty

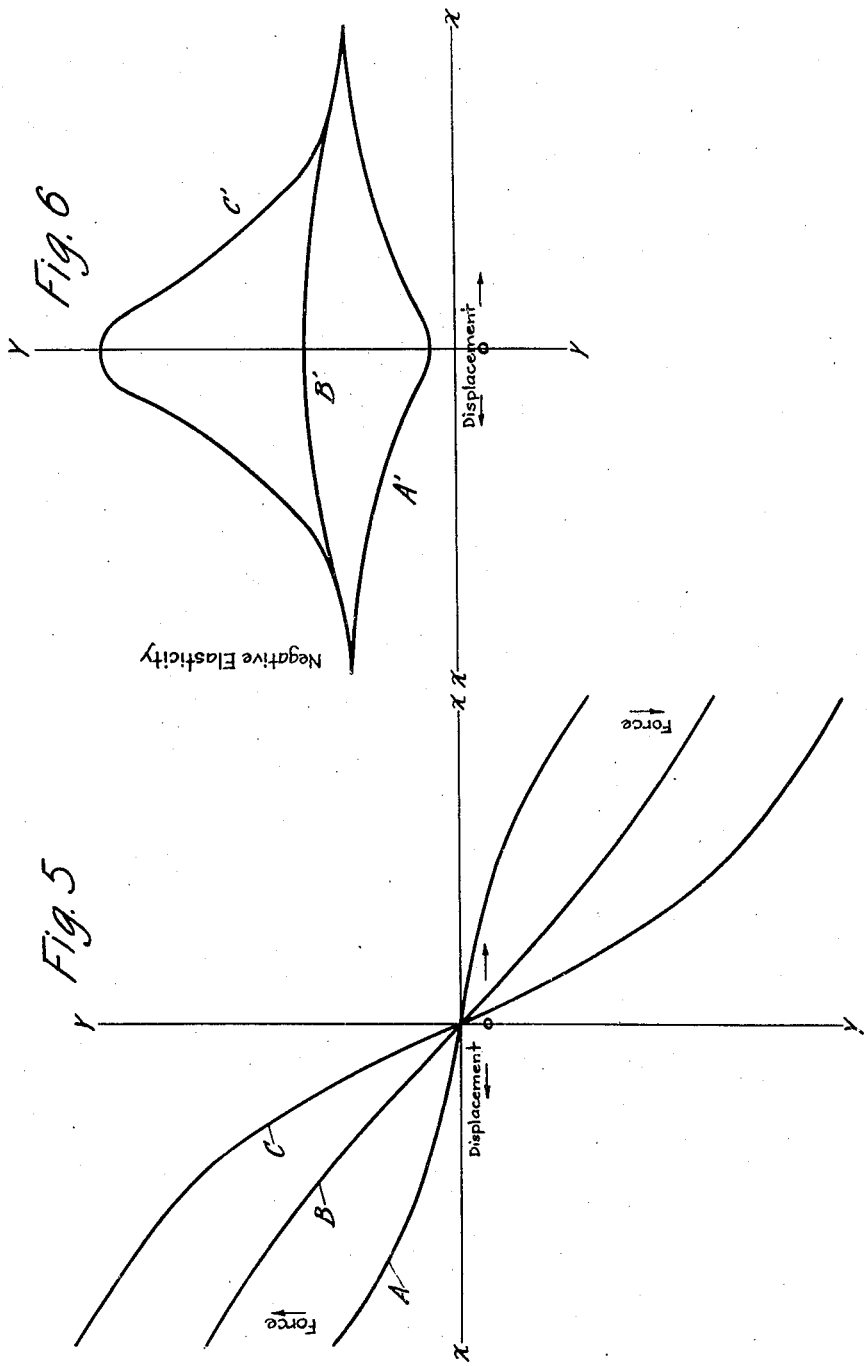

April 16, 1929.  H. C. HARRISON  1,709,571
ELECTROMECHANICAL TRANSLATING DEVICE
Filed Nov. 3, 1925    3 Sheets-Sheet 3
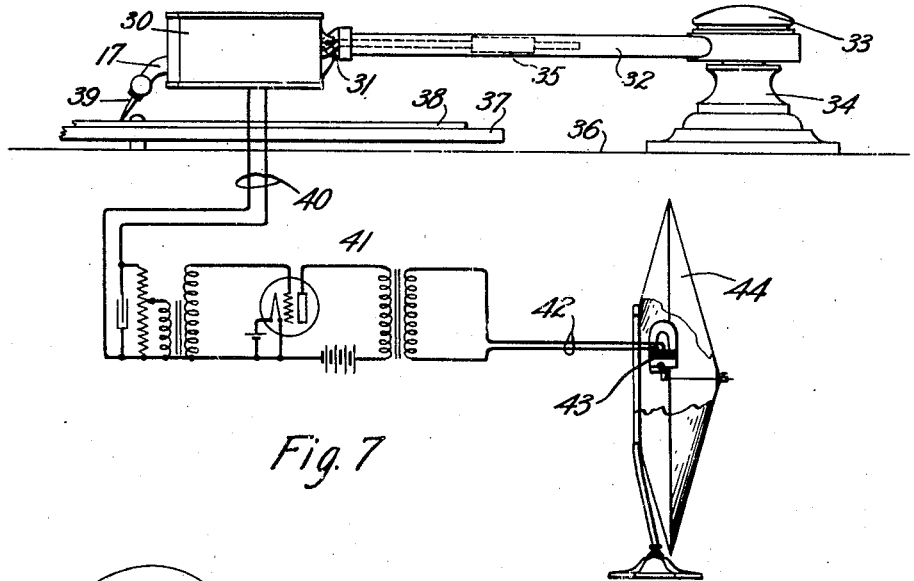
Fig. 7
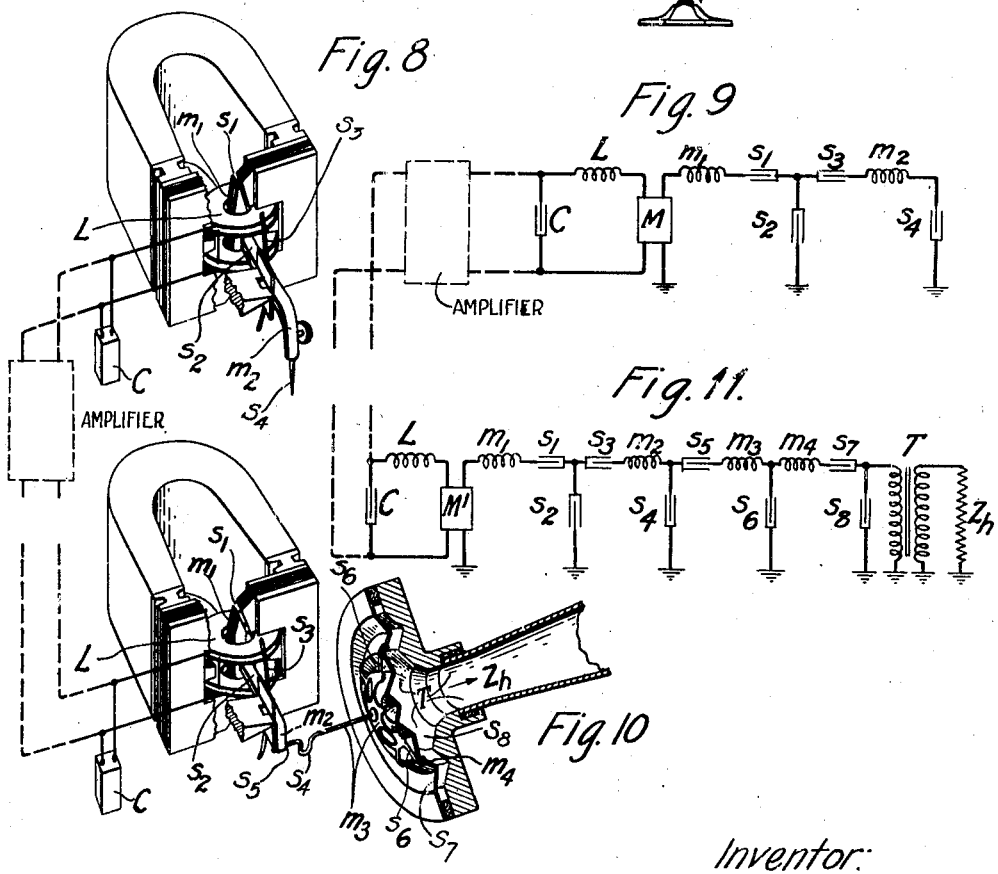
Fig. 8
Fig. 9
Fig. 11
Fig. 10
Inventor:
Henry C. Harrison.
by ⸺ Atty Patented Apr. 16, 1929.

1,709,571

UNITED STATES PATENT OFFICE.

HENRY CHARLES HARRISON, OF PORT WASHINGTON, NEW YORK, ASSIGNOR TO WESTERN ELECTRIC COMPANY, INCORPORATED, OF NEW YORK, N. Y., A CORPORATION OF NEW YORK.

ELECTROMECHANICAL TRANSLATING DEVICE.

Application filed November 3, 1925. Serial No. 66,624.

This invention relates to an electromagnetic device suitable for use as a relay or as a phonograph recorder or reproducer, magneto telephone, loud speaker motor element, or in similar fields. The device is reversible and may be operated either as a generator or as a motor element, since it generates electric current when mechanical energy is applied and produces mechanical energy when electrical energy is applied.

An object of the invention is to realize, in a device of the general character indicated, the conversion of electrical variations into corresponding mechanical movements or vice versa with high efficiency and fidelity.

A further object of the invention, when it is applied to the transmission, reception, reproduction, or recording of sound, is to realize the same order of faithfulness in converting from electrical to mechanical variations, or vice versa, throughout a wide range of frequencies, and particularly throughout the range of frequencies essential to the high quality transmission and reproduction of speech and music.

Aside from its application to sound transmission and the like, the device of the invention is admirably suited to use as a vibrating relay, and on account of the high efficiency and sensitivity as well as its distortionless action, it is particularly adapted for use as a receiving relay in telegraph or cable systems such as trans-oceanic cable circuits or in radio. The small mass of the moving parts and the positive control of the armature in all positions enables the relay of the invention to be operated at high speed without loss of its fidelity in following the impressed signal variations.

The high efficiency is secured largely by such features as designing the magnetic circuit and positioning the electrical windings so as to concentrate an unusually large fraction of the alternating magnetic flux in the air gap between the armature and the pole pieces where it is most effective in producing driving force.

Further features contributing to efficiency are shaping the armature to make its vibratory mass unusually low for its flux carrying capacity, making the steady flux density unusually high, and coupling through shunt capacities and elasticities to properly designed electrical and mechanical networks.

Substantial freedom from distortion, namely, the addition of harmonics, which occurs when the ratio of driving force on the armature to driving current changes with displacement, is obtained by making the cross-section of the magnetic circuit so small that the increase in reluctance in the magnetic circuit, due to approaching saturation as the armature approaches the pole-pieces, prevents any substantial change with amplitude in the driving force. The driving force is proportional to the product of the alternating magnetic flux and the steady field flux through the armature and following the principles outlined in this specification, the product of the alternating flux per unit current and the steady flux can be made substantially constant for the operating amplitudes. When the device is operated as a generator and connected to the correct electrical circuit, the voltage generated is proportional to the velocity of vibration of the armature and substantially independent of amplitude over the operative portion of the air-gap.

The increase in magnetic force per unit of armature displacement being substantially constant over the major part of the air-gap, permits the employment of a simple spring of substantially constant elasticity for balancing the steady magnetic force acting on the armature at all displacements. This simple spring design and adjustment are important features of the structure of this invention. A good degree of balance is important in operating at low frequencies. This is obtained when the magnetic force and the mechanical reacting force both acting on the armature substantially neutralize each other. In practice, the restoring force is slightly the greater of the two.

Another feature of this invention consists in designing the steady field magnetic circuit, so that the steady magnetic flux furnished by the field magnet is limited and automatically made substantially constant. In the specific embodiment to be described hereinafter, this is done by inserting in the magnetic circuit sections of permalloy of limited cross-section or other magnetic material which saturates relatively sharply and which limits the flux to the desired amount.

The structure of the invention is a lumped mechanical transmission structure having a band-pass filter characteristic. When employed, for example, as a phonograph reproducer, the point of the needle from the viewpoint of mechanical impedance is a shunt elasticity, the needle, its holder and the spring holder are a series mass, the balancing spring is a series elasticity, the shaft extending to the armature is a shunt elasticity, the elasticity of the magnetic field is a negative series elasticity, and the armature is a series mass. The coupling between the mechanical and the electrical circuit is made through the magnetic field.

The force-displacement curve is substantially a straight line over a wide amplitude and this has to a large degree been secured by having such relations between the flux and the flux carrying capacity of the flux circuit that parts of the circuit such as the armature or the pole-pieces or both approach saturation as the armature approaches the pole-pieces.

Some of the general features of the invention have been broadly outlined above. Further objects and features will appear and a better understanding of typical embodiments will be had from the following detailed description in connection with the accompanying drawings.

Referring to the drawings, Fig. 1 is a side view of the vibratory electromagnetic element or relay;

Fig. 2 is a top view of the element with a portion of the pole-pieces cut away;

Fig. 3 is an end view of the element along the plane 3—3 indicated in Fig. 2;

Fig. 4 is an end and part cross-section view of the element along the plane 4—4 indicated in Fig. 2;

Fig. 5 is a drawing of three force-displacement curves;

Fig. 6 is a drawing of three negative-elasticity displacement curves;

Fig. 7 shows the element in a phonograph reproducer and as the motor element in a loud speaker together with a suitable connecting circuit;

Fig. 8 is a perspective schematic view of the element used in connection with a phonograph;

Fig. 9 is a combined mechanical and electrical impedance diagram of the phonograph reproducer or generator with elasticity, mass, capacity, inductance, and an electromagnetic coupling element;

Fig. 10 is a perspective schematic view of the element used in connection with a loud speaker; and Fig. 11 is a combined electrical and mechanical impedance diagram of a loud speaker, or motor and load, with inductance, capacity, mass, elasticity, resistance, and an electromagnetic coupling element.

Similar reference characters designate similar parts in the different views.

Referring to Figs. 1 and 2 which show side and top views of the vibratory electromagnetic element, the latter being in partial cross-section to show the armature, the supporting member around which the parts are associated is designated by 10, the laminated pole-pieces by 11, the steady field magnet by 12, the armature by 13, the shaft on which the armature is mounted by 14, the spring for the return of the armature to its mid-position by 15, the bearing support for the armature shaft by 16, a member for applying or receiving mechanical power to or from the armature by 17, and the alternating current windings by 18 and 19. The tapering section of the steady field or permanent magnet 12 as the pole-pieces are approached is shown in Fig. 2. The steady flux furnished by the field magnet is limited and made substantially constant by inserting in the magnetic field circuit the members 20 and 21 of such magnetic material as permalloy which reaches saturation at very small magneto motive forces and hence up to the point of saturation offers very little reluctance to the flux but beyond this point acts substantially like so much air-gap in limiting the flux. Such a member, or members, in the magnetic circuit acts as a magnetic choke and tends to limit the magnetic flux to the saturation density of the material and gives substantially uniform magnetic action from magnets varying considerably in strength above the saturation point of the choking member.

The cross-section area and shape of the ends of the pole-pieces 11 and of the armature are important and their general design is more particularly shown in Fig. 3 where the windings 18 and 19 are shown in cross-section. In carrying out this invention as previously stated, the armature and pole-pieces should be so designed that an increase in reluctance occurs in the magnetic circuit due to saturation as the armature approaches the pole-pieces. It is readily seen that this design permits having the armature of a suitable length and tapered at each end and associated with pole-pieces whose cross-section may be made such that the most suitable magnetic flux may pass so as to obtain a substantially straight line force-displacement curve of the force between the armature and pole-pieces at any operable position. The shaft 14 in cross-section and its means for attachment to the armature are shown in Fig. 3.

Details of the spring for positioning the moving parts and applying a substantially constant elasticity to the armature to counteract the magnetic elasticity from the field magnet are particularly shown in Fig. 4 where certain parts are in cross-section. The frame member 10 carries the armature support 16 which has a knife edge bearing 22 which engages the groove 23 in the shaft 14. On each side of the shaft 14 are the right and left lugs 24 which are suitably positioned with reference to the axis of rotation for the spring 15 to engage them to hold the armature in place and in a manner to avoid longitudinal movement of the spring. The spring 15 is held in the frame at each end by means of the screw adjustment members 25 and 26. These members are threaded into the frame 10 at each side and have holes through their center in which the spring 15 engages. The axis of these holes is perpendicular to the shaft 14 and positioned so that when the spring 15 rests against the lugs 24 on each side of the armature shaft and the ends of the springs are in the adjustable supports 25 and 26, the spring is placed under a bending tension in a manner to force the armature shaft into proper engagement with its bearings. Screwing the members 25 and 26 inwardly places the spring 15 under greater tension and screwing one or the other of the members 25 or 26 in to a greater or lesser degree permits adjusting the armature in any static angular position desired, which under normal circumstances is its mid-position so as to make the air-gaps symmetrical as between the armature and the fixed pole pieces. It is obvious that the vibration of the armature in either direction from its mid-position tends to bow the spring 15 and the arrangement of this spring is such that it has substantially the same elasticity characteristic as the elasticity of the steady magnetic field has upon the armature but the two elasticities oppose each other. It is important to have no lateral translation of the spring 15. The spring is positioned with reference to the center of rotation of the armature and the adjusting members 25 and 26 which are offset at a proper distance from the center of rotation so that when the armature vibrates the spring is not given a motion of translation and it may also be otherwise limited as to translation.

The substantially straight line force displacement curve is secured as above stated by properly proportioning the cross-section area of the armature and the pole-pieces for a given steady magnetic field flux. Fig. 5 shows three curves for three steady fields of different strengths as applied to the same armature and pole-pieces. Displacement is plotted along the X axis and force along the Y axis. Curve A represents the condition where the flux does not sufficiently saturate either the armature or the pole-pieces. Curve B represents the condition where the flux substantially correctly saturates parts of the magnetic circuit, mainly the armature and to some extent the pole-pieces, as the armature is displaced and the force-displacement curve is substantially a straight line over the greater part of the air-gap. Curve C represents the condition where the flux is so strong that the armature saturates at too small a displacement. Curves A and C indicate that serious distortion occurs even with relatively low amplitudes when either insufficient or over saturation exists. It is therefore obvious that the armature operating over the particular air-gap or amplitude with the pole-pieces used, should be operated at the field strength indicated by curve B. If a stronger field is required, it is necessary to use an armature of larger cross-section or to use a shorter air-gap. If a weaker field is used a thinner armature or a longer air-gap is necessary. By properly proportioning these three factors, it is possible within the limits of the magnetic material to secure a substantially straight force-displacement curve for any strength of field desired.

The force-displacement curve of Fig. 5 may be shown in another form as shown in Fig. 6. representing what has been called the negative-elasticity of the magnetic field and defined as the slope of the force-displacement curve. For example, the force-displacement curve which is a straight line gives a constant negative-elasticity. This is shown by the force-displacement curve B of Fig. 5 which gives a negative-elasticity curve B' of Fig. 6 which is nearly horizontal; while curve C gives a negative-elasticity curve C' of something over twice as great in the center of the air-gap as it would near the pole-pieces; and curve A gives a negative-elasticity curve A' much smaller in the center of the air-gap than near the pole-pieces. These two types of curves express a similar characteristic in two different ways and both indicate the fact that the magnetic elasticity is substantially proportional to the displacement of the armature when the curves are practically straight lines.

It is desirable to maintain a constant negative-elasticity throughout as much of the air-gap as possible for the several reasons already suggested. In order to balance the magnetic field over a large part of the air-gap with a simple constant elasticity balancing spring, it is clear from Fig. 6 that the elasticity of the field should be constant over this portion of the air-gap.

By the methods of construction of the elements which are shown in the impedance diagrams Figs. 9 and 11 referred to more in detail hereinafter, there is an elasticity impedance transformation ratio which depends on the negative-elasticity of the field. Numerically this is equal to $$r = \left(1 - \frac{s_1}{s_2}\right)^2$$

where $r$ is the impedance transformation ratio and $s_1$ and $s_2$ are the elasticities indicated in the drawings of the magnetic flux in the air-gap and the shaft leading from the armature, respectively. From this relation it is clear that if $s_1$ varies appreciably over the cycle, the impedance transformation ratio will also vary which will result in a form of non-linear distortion. The construction disclosed for this invention is free from this type of distortion.

A second cause of distortion which is avoided in the structure of this invention is that present when the steady flux through the armature is not proportional to the armature displacement from its neutral position. When the magnetic circuit is designed to have an approximately flat negative-elasticity-displacement curve, the mechanical vibratory force is substantially proportional to the alternating current for all intensities of current.

From elementary magnetic laws, the force on the armature is proportional to the square of the flux density in the air-gap. For the four-air-gap type of armature under consideration, the force is proportional to $\Phi_T \Phi_A$, where $\Phi_T$ is the flux supplied to the pole-pieces and $\Phi_A$ is the flux passing longitudinally through the armature. The requirements for constant elasticity or in other words for a straight force-displacement curve requires that this product be proportional to displacement, whereas, reduction of the second type of distortion, namely, that caused by the variation of the armature flux from the steady field as considered above, requires that the flux $\Phi_A$ passing longitudinally through the armature be proportional to displacement. In order to fulfill both of these conditions, it is clear that the flux $\Phi_T$ supplied to the pole-pieces must be kept constant. In the type of magnetic circuit under consideration, this is found to be substantially the case and the requirements of substantially constant field elasticity and minimum distortion are not mutually exclusive.

Fig. 7 shows schematically an application of the vibratory electromagnetic element of this invention in a phonograph reproducer as a generator element and in an electrically operated loud speaker as a motor element. One of the elements is actuated as a generator through an attached stylus engaging a phonograph record and a similar element is used as a motor for driving the diaphragm within the receiver, the two being electrically interconnected, preferably through an amplifying circuit which permits control of the input into the loud speaker.

The reproducer element is mounted in the casing 30 which is attached, through a horizontal hinge 31, permitting vertical rotation through a small angle, to the swinging arm 32 which in turn is supported at the other end by means of a vertical hinge 33 permitting horizontal rotation about the vertical axis of the fixed base 34. The weight of the reproducer element is properly counter-balanced by means of the weight 35 so that the stylus engages the phonograph record with the proper pressure. Other means such as a spring might also be used in place of the counter-weight. The hinge 31 is so designed that the stylus end of the reproducer element may be lifted through an angle sufficient to permit changing the needle and the connection with the counter weight 35 is such that the weight is not moved unduly when the reproducer is raised to change the needle. The swinging arm supporting the reproducer element permits the same freedom of action when the stylus engages the phonograph record as is provided by the tone arm of an ordinary phonograph. A portion of the phonograph cabinet is shown at 36, the turn-table at 37, and the record at 38. The base 34 is placed upon the phonograph 36 in such position that the stylus 39 extending from the reproducer element held in the casing 30 engages the phonograph record in the usual manner. When the phonograph record is rotated, it vibrates the armature of the reproducer and this generates electrical currents in accordance with the record.

The reproducer is connected by means of the circuit 40 to the amplifier 41 and in turn by means of the circuit 42 to the motor element 43 of the loud speaker 44. It is obvious that electrical currents generated by means of the reproducer will drive the diaphragm of the loud speaker in accordance with the record and that the electrical input into the loud speaker may be controlled by adjustment of the amplifier or by other suitable means. One phonograph reproducer may operate a number of loud speakers and they may be placed in different locations.

This electromagnetic element may be used as a phonograph recorder for the making of records when connected through a proper electrical circuit with a suitable transmitter.

The electromagnetic vibratory elements used as the reproducer and as the motor element in the loud speaker are of unusual high efficiency and operate with substantially no distortion which results in the especially high quality of reproduction in a phonograph system.

The schematic perspective view of a reproducer element shown in Fig. 8 is designed primarily to show the masses and the elasticities involved in the operation of the device. The electrical analog or impedance diagram for this is illustrated in Fig. 9 and analogous parts in each figure are designated by similar reference characters. The mechanical system comprises the needle and the needle holder which is an elasticity $s_4$; the needle and spring which is a series mass $m_2$; the spring which is a series elasticity $s_3$; the shaft extending to the armature which is a shunt elasticity $s_2$; the elasticity of the magnetic field in the air-gap which is a negative series elasticity $s_1$; and the armature which is a series mass $m_1$.

The coupling between the mechanical circuit and the electrical circuit is schematically shown in Fig. 9 by the rectangle M. The electrical system comprises the series inductance L, the capacity C, and load resistance.

The mechanical portion of this device has substantially all of the characteristics and capabilities of electrical filters, and values can be assigned to its several elements for causing it to have the required cut-off frequency and the required characteristic impedance. Fig. 9 illustrates by an equivalent electrical impedance diagram the impedance relations existing both in the mechanical and electrical parts of the electromagnetic vibratory reproducer element. Since mass corresponds to inductance and elasticity corresponds to the reciprocal of electrical capacity, the electrical equivalent of the electromagnetic element when connected to an electrical line may be readily illustrated as shown in the impedance diagram Fig. 9.

Figs. 10 and 11 show the electromagnetic vibratory element as the motor element of a loud speaker and are analogous to Figs. 8 and 9, respectively, the former showing by a schematic view of the motor element the masses and elasticities involved in the operation of the device and the latter illustrating by an equivalent electrical impedance diagram the impedance relation existing in both the electrical and mechanical parts of the loud speaking receiver. The masses and elasticities of the various parts of the telephone receiver shown in the drawings should be arranged and given values to form a mechanical network which is capable of the transmission of mechanical vibrations with substantially constant reproduction over the entire frequency band, that is, a network which has a substantially pure resistance characteristic over the whole voice frequency range. The incoming current impressed upon the windings of the electromagnetic element meets the capacity C and the inductance L. The coupling between the electrical circuit and the mechanical circuit is schematically shown in Fig. 11 by the rectangle M'. Looking into the mechanical system the series inductance $m_1$ is analogous to the mass of the armature, the series capacity $s_1$ corresponds to the elasticity of the magnetic flux in the air-gap; the shunt capacity $s_2$ corresponds to the elasticity of the shaft leading from the armature; the series capacity $s_3$ corresponds to the elasticity of the spring tending to restore the armature to its mid-position; the series inductance $m_2$ corresponds to the mass on the end of the armature shaft; the shunt capacity $s_4$ corresponds to the elasticity of the driving rod leading from the end of the shaft to the mechanical transmission system associated with the diaphragm; the series capacity $s_5$ corresponds to the elastcity of the connection of the armature shaft lever arm and driving rod connected with the diaphragm; the series inductance $m_3$ corresponds to the mass of this driving rod and spider member connected to the diaphragm; the shunt capacity $s_6$ corresponds to the elasticity of the spider arms connected with the diaphragm; the series inductance $m_4$ corresponds to the mass of the diaphragm; the series capacity $s_7$ corresponds to the elasticity of the diaphragm; the shunt capacity $s_8$ corresponds to the elasticity of the air in front of the diaphragm; and the system is terminated by the coupling transformer T for matching the impedance of the diaphargm and that of the air in the horn $Z_h$.

The invention disclosed herein is obviously susceptible to various modifications and adaptations without departing from the scope and spirit of the invention and it is not intended to limit the invention to the specific construction herein shown and described except as defined by the scope of the appended claims.

What is claimed is:

1. In an electromagnetic device, a field magnet for producing a substantially steady field between its poles, and an armature mounted for oscillation between said poles, said armature and magnet being dimensioned with respect to the air-gap and the field strength to produce a flux density in the armature and field magnet resulting in an attractive force on the armature substantially proportional to the displacement of the armature from its neutral position towards the field magnet.

2. In an electromagnetic device, a field magnet for producing a substantially steady field between its poles and an armature mounted for oscillation between said poles, the poles of said armature and of said magnet being tapered to reduce their cross-section as the air-gap is approached and thereby limit the increase in magnetic flux density between the field magnet poles and the armature as the armature approaches the poles of the field magnet, to a rate substantially proportional to the displacement of said armature.

3. An electromagnetic device comprising a field magnet for producing a steady field between its poles, an armature of magnetic material mounted for oscillation between said poles, and a spring associated with said armature to resist movement thereof by a force proportional to the displacement of said armature, and means for producing a magnetic force on the armature proportional to the displacement to substantially balance the said mechanical force of the spring at all positions of the armature within its amplitude of oscillation under static conditions.

4. An electromagnetic device comprising a field magnet for producing a steady field between its poles, an amature mounted for oscillation between said poles, a spring associated with said armature to resist movement thereof by a force proportional to the displacement of said armature, a winding for said armature to vary the magnetic flux therethrough in accordance with control currents, and means for limiting the magnetic flux between said field magnet and said armature to an amount proportional to the displacement of said armature, said means comprising portions of the magnetic circuit of reduced cross-section whereby as the armature approaches the poles of the steady field magnet, saturation is approached at a rate to make the magnetic and mechanical elasticities substantially equal and opposite.

5. An electromagnetic device comprising a field magnet for producing a steady field between its poles, an armature mounted for oscillation between said poles, a winding for said armature to vary the magnetic flux therethrough, a restoring spring for exerting a force on the armature substantially proportional to its displacement, and means for balancing the magnetic force on said armature against the restoring force of said spring comprising tapered portions of the pole-pieces and armature, the cross-sectional areas of the tapered portions being dimensioned to make the flux interlinking the field and armature approach saturation with decreasing air-gap at a rate to make the magnetic attractive force substantially proportional to the armature displacement.

6. A magnetic vibratory system having an armature, a mechanical vibratory system connected to said armature and having a substantially constant response over the essential speech and music frequency and amplitude range, said magnetic vibratory system also having a substantially constant response over the essential speech and music frequency and amplitude range.

7. In an electromagnetic device comprising a field magnet for producing a substantially steady field between its poles, and means for limiting the magnetic flux to a predetermined amount, said means consisting of a magnetic member inserted in the magnetic circuit of the steady field, said magnetic member saturating sharply at a lower magnetizing field than the magnet.

8. In an electromagnetic device comprising a field magnet for producing a field between its poles, and means for limiting the magnetic flux to a predetermined amount substantially irrespective of changes in the magneto-motive force above the said predetermined amount, said means consisting of a section of permalloy in the magnetic circuit of the steady field.

9. In an electromagnetic device comprising a field magnet for producing a substantially steady magnetic field between its poles, an armature positioned to vibrate between said field magnet poles, and windings associated with said armature to vary the flux therethrough, said poles of the steady field magnet and the ends of said armature being tapered so that as the armature displacement occurs saturation of the said pole members and armature tips takes place at a rate such that the vibratory force on the said armature is substantially proportional to the alternating current in the windings associated with the said armature and substantially independent of the displaced position of the armature over the operative portion of the air-gap.

10. An electromagnetic device having a field magnet for producing a substantially steady field between its poles, an armature mounted for oscillation between said poles, a winding associated with said armature for producing an alternating magnetic flux therein, said armature and field magnet being dimensioned with respect to the air-gap and field strength produced by said field magnet and the alternating magnetic flux produced in the armature by the driving current such that the driving force is proportional to the product of the alternating flux and the steady field flux, and the product of the alternating flux per unit current and the steady flux is substantially constant for the operative amplitude.

11. In an electromagnetic device comprising a permanent magnet for providing a steady field, a pair of pole pieces connected to each end of said magnet and forming two air gaps, an armature adapted to oscillate about its center, each end vibrating in an air gap, said armature being tapered at each end and each of said pole pieces tapering toward the air gap, both armature and pole pieces being reduced in cross section to a point that saturation by the steady field is rapidly approached in both as the armature is displaced from its neutral position.

In witness whereof, I hereunto subscribe my name this 2nd day of November, A. D. 1925.

HENRY CHARLES HARRISON.